US009725901B2

(12) United States Patent
Chu et al.

(10) Patent No.: US 9,725,901 B2
(45) Date of Patent: Aug. 8, 2017

(54) COMPOSITE BOARD

(71) Applicant: Chu & Son Inc., New York, NY (US)

(72) Inventors: Eddie Wai Ho Chu, New York, NY (US); Wesley Jin Bong Lai, New York, NY (US)

(73) Assignee: Chu & Son Inc., New York, NY (US)

( * ) Notice: Subject to any disclaimer, the term of this patent is extended or adjusted under 35 U.S.C. 154(b) by 44 days.

(21) Appl. No.: 14/613,439

(22) Filed: Feb. 4, 2015

(65) Prior Publication Data

US 2016/0159032 A1 Jun. 9, 2016

Related U.S. Application Data

(63) Continuation-in-part of application No. 14/564,388, filed on Dec. 9, 2014.

(51) Int. Cl.
*B32B 38/04* (2006.01)
*B32B 37/02* (2006.01)
(Continued)

(52) U.S. Cl.
CPC ............. *E04C 2/26* (2013.01); *B32B 7/12* (2013.01); *B32B 13/02* (2013.01); *B32B 13/10* (2013.01);
(Continued)

(58) Field of Classification Search
CPC .. E04C 2/26; B32B 7/12; B32B 13/02; B32B 13/10; B32B 2250/02; B32B 2250/03;
(Continued)

(56) References Cited

U.S. PATENT DOCUMENTS

RE32,038 E * 11/1985 Clear .................. B28B 1/16
156/243
5,256,222 A  10/1993 Shepherd et al.
(Continued)

FOREIGN PATENT DOCUMENTS

CN   202391062 U   8/2012
CN   102718463 A   10/2012
(Continued)

OTHER PUBLICATIONS

Machine translation of RU2504527 (C1) to Kaustik Aoot; Jan. 20, 2014; 7 pages.*

(Continued)

*Primary Examiner* — Linda L Gray
(74) *Attorney, Agent, or Firm* — Kaplan Breyer Schwarz, LLP; Janine D. Geraigery, Esq.

(57) ABSTRACT

A composite board is formed from binding a cover layer to a base layer, wherein the base layer has a composition comprising one or more of the following ingredients: magnesium oxide, recycled magnesium oxide, fibrous chips, wood chips, bamboo chips, chemical additive and water. A method of manufacturing the composite board includes providing the base layer, which includes preparing a semi-arid mixture of the above ingredients, and pouring the mixture through a funnel onto a conveyor belt. The conveyor belt passes the mixture through a series of rollers to remove excess liquid. The layer is cut into panels, which are heat before being sprayed with dried magnesium oxide. A binding agent is applied to one side of the base layer. The cover layer has a bottom surface which is then aligned and bonded to one side of the base layer.

8 Claims, 6 Drawing Sheets

(51) Int. Cl.
*E04C 2/00* (2006.01)
*E04C 2/26* (2006.01)
*B32B 7/12* (2006.01)
*B32B 13/02* (2006.01)
*B32B 13/10* (2006.01)
*B32B 13/12* (2006.01)
*B32B 37/00* (2006.01)

(52) U.S. Cl.
CPC ............ *B32B 13/12* (2013.01); *B32B 37/003* (2013.01); *B32B 37/02* (2013.01); *B32B 2250/02* (2013.01); *B32B 2262/065* (2013.01); *B32B 2262/067* (2013.01); *B32B 2264/065* (2013.01); *B32B 2264/067* (2013.01); *B32B 2307/3065* (2013.01); *B32B 2307/50* (2013.01); *B32B 2307/542* (2013.01); *B32B 2307/546* (2013.01); *B32B 2419/00* (2013.01); *B32B 2419/04* (2013.01); *B32B 2419/06* (2013.01); *B32B 2471/00* (2013.01); *B32B 2607/00* (2013.01); *Y10T 156/1085* (2015.01); *Y10T 156/1727* (2015.01); *Y10T 156/1741* (2015.01)

(58) Field of Classification Search
CPC ........ B32B 2262/065; B32B 2262/067; B32B 2264/065; B32B 2264/067; B32B 37/003; B32B 37/02; B32B 37/1246; B32B 38/0004; B32B 3/0036; B32B 2307/3065; B32B 2307/542; B32B 2307/546; B32B 2419/04; B32B 2471/00; B32B 2607/02; Y10T 156/1085; Y10T 156/1727; Y10T 156/1741

See application file for complete search history.

(56) References Cited

U.S. PATENT DOCUMENTS

| | | |
|---|---|---|
| 6,773,794 B2 | 8/2004 | Lindner |
| 6,780,356 B1 | 8/2004 | Putt et al. |
| 7,255,907 B2 | 8/2007 | Feigin et al. |
| 7,867,597 B2 | 1/2011 | Feigin et al. |
| 7,998,547 B2 | 8/2011 | Feigin et al. |
| 2006/0070321 A1 | 4/2006 | Au |
| 2008/0145550 A1 | 6/2008 | Caine et al. |
| 2009/0011279 A1 | 1/2009 | Wisenbaker, Jr. et al. |
| 2010/0077939 A1 | 4/2010 | Trout |

FOREIGN PATENT DOCUMENTS

| | | |
|---|---|---|
| CN | 202562237 U | 11/2012 |
| CN | 103497002 A | 1/2014 |
| RU | 2504527 C1 | 1/2014 |

OTHER PUBLICATIONS

Authorized Officer: L. Andreeva, "International Search Report and Written Opinion" dated Jun. 23, 2016 in counterpart PCT Application No. PCT/US2016/016622, Publisher: PCT, Published in: RU.
Christina Johnson, "Non-Final Office Action", U.S. Appl. No. 14/564,388, Feb. 10, 2017, p. 9 pp., Publisher: USPTO, Published in: US.

\* cited by examiner

COMPOSITE BOARD

CROSS-REFERENCE TO RELATED APPLICATION

The present application is a continuation-in-part of application Ser. No. 14/564,388 filed Dec. 9, 2014 in the U.S. Patent & Trademark Office, the entire disclosure of which is incorporated herein by reference.

BACKGROUND OF THE INVENTION

Field of the Invention

The present invention relates generally to composite boards and the method of manufacturing same for use as building material. More particularly, the invention is directed toward a composite board having a base layer bonded to a cover layer, wherein the base layer is comprised of a mixture of magnesium-oxide, fibrous chips, and chemical additive dissolved in water. The composite boards are used for building homes and other types of structures including constructing interior walls, floors, and roofs.

Description of the Related Art

Conventional composite boards include a base panel layer bonded to a cover layer. It is known that base layers of conventional composite boards are manufactured from a slurry mixture that is placed between two layers of reinforced material, which may include glass fabric mesh.

The base panel layer is conventionally formed from a mixture of inorganic magnesium compounds, wood fibers, perlite, chemical additives, water and other substances. The slurry mixture is then extruded onto a supporting surface on top of a PVC mold, between layers of glass fabric. The wet slurry mix is cut to the exact size of the mold and placed within the mold and then delivered on top of a movable metal rack to a curing room or space for drying. The mix is set to dry within the mold for several hours at room temperature. After which, the panel is separated from the mold and left in a stack for several more hours to further dry. The panels are then trimmed and sanded to a uniform thickness and the process is complete.

It is apparent that several problems exist with the current process including that it is very costly and unduly lengthy. Considerable manpower is required over the course of several days. A large amount of space is necessary for storing the panels during curing. The glass fabric used for reinforcing the strength of the panel is costly and accounts for approximately twenty percent of the total cost of the raw materials required.

Furthermore, the currently known process represents a considerable amount of economic waste, including the raw materials wasted when the panels are trimmed and sanded.

Moreover, the composite boards suffer from a number of structural and environmental shortcomings. The magnesium chloride incorporated in the base panel layer composition allows for leaching and breeding, substantially weakening the material. The flexural and shear strengths are also such that they leave the panels vulnerable to cracking or splitting. The glass fabric used, although alkaline resistant, eventually erodes the fabric gradually weakening the panels.

Thus, a faster, cost-friendly, environmentally conscience process resulting in a more stable product is highly desired.

It is, therefore, a primary object of the present invention to provide a composite board having a base layer bonded to a cover layer, wherein the base layer is comprised of a mixture of magnesium oxide, fibrous chips, and chemical additive dissolved in water.

It is another object of the present invention to provide an improved base panel layer that presents a lower risk of cracking or splitting by having increased flexural and shear strength, is recyclable, and simultaneously increases the numerous positive characteristics that make the existing composite board's exceptional wallboards in the construction industry today.

It is another object of the present invention to provide an improved base panel layer that is twice as strong as the existing construction panels, while still maintaining superior resistance and durability to damage from fire and water.

It is another object of the present invention to provide an improved base panel layer comprising a small percentage of magnesium oxide, low grade or recycled material, bamboo chips, chemical additive and water.

It is another object of the present invention to provide an improved base panel layer no longer comprising glass fabric, magnesium chloride, neutralizing chemical additives, and perlite.

It is another object of the present invention to provide an improved base panel layer that is free from leaching or breeding issues.

It is another object of the present invention to provide an improved base panel layer comprising environmentally-friendly recycled material including dust after sanding, trimmings, and broken panels.

It is another object of the present invention to manufacture an improved base panel layer with substantially desirable properties in a single day.

It is another object of the present invention to manufacture an improved base panel layer in a process that bonds the semi-arid mix under pressure, in lieu of heat.

It is another object of the present invention to manufacture an improved base panel layer in a process free of molds and racks.

BRIEF SUMMARY OF THE INVENTION

In accordance with one aspect of the present invention, a composite board is provided including a base layer having a first side and second side opposite said first side and comprising a semi-arid mixture of magnesium oxide, fibrous chips, and chemical additive dissolved in an aqueous solution. The composite board further includes a cover layer having a top and bottom surface, wherein the bottom surface is arranged on the first side of the base layer, and a binding agent for connecting the bottom surface of the cover layer to the first side of the base layer. The cover layer may be wood or linoleum. The binding agent may be seccotine. The magnesium oxide may have purity in the range of 20%-79%. The mixture may further comprise recycled base layers. The fibrous chips may be from the group consisting of wood and bamboo chips. The base layer may have a thickness in the range of 10-18 mm. The cover layer may have a thickness in the range of 0.5-5 mm. The cover layer may have a thickness in the range of 2-3 mm. The manufactured panel may be used to construct load bearing walls, non-load bearing walls, ceilings, roofing, siding, insulated walls, and tile backer.

In accordance with an additional embodiment a composite board is provided comprising a cover layer having a bottom surface, a base layer bonded to the bottom surface of the cover layer. The base layer having a first side and a second side and comprising a mixture of at least 5% magnesium oxide, at least 50% recycled magnesium oxide, at least 40% fibrous chips, and at least 5% chemical additive in an aqueous solution. The recycled magnesium oxide material may include recycled manufactured panel material. The composite board includes a binding agent for bonding the cover layer to the base layer. The recycled magnesium oxide includes recycled composite board or base layer. The fibrous chips may be from the group consisting of wood and bamboo chips.

In accordance with an additional embodiment, a method of manufacturing a composite board is provided comprising providing a base layer panel having a first side and a second side opposite the first side, the base layer panel includes the steps of preparing a semi-arid mixture of high purity magnesium oxide, low purity magnesium oxide, fibrous chips, and chemical additive in an aqueous solution. Then, pouring the semi-arid mixture through a funnel and dispensing the semi-arid mixture from the funnel onto a conveyor belt. Next, passing the dispensed semi-arid mixture through a roller, where the roller is configured to press and spread the semi-arid mixture against the conveyor belt to a layer of desired uniform thickness. Then, pressing the layer through a compressor, where the compressor is configured to remove excess liquid from the layer, before cutting the compressed layer into panels of predetermined length. Then, a binding agent is applied to the first side of the base layer panel. A cover layer having a top and bottom surface is provided. The bottom surface of the cover layer is connected to the first surface of the base layer panel. The high purity magnesium oxide may have purity of at least 79%. The low purity magnesium oxide may have purity of at least 20%. The low purity magnesium oxide mixture may further comprise recycled base layer panels. The fibrous chips may be from the group consisting of wood and bamboo chips.

The method may further comprise drying the panels, heating the panels to a desired temperature, and heating the panels by solar energy.

The method may further comprise passing the panels through a jet, where the jet is configured to spray dry magnesium oxide on the panels, and stacking the panels.

In accordance with an additional embodiment, a system for manufacturing a composite board is provided comprising means for preparing a semi-arid mixture of high purity magnesium oxide, low purity magnesium oxide, fibrous chips, and chemical additive in an aqueous solution. The system includes means for dispensing the semi-arid mixture onto a conveyor belt, and means for spreading the semi-arid mixture against the conveyor belt to a layer of desired uniform thickness. The system includes means for removing excess liquid from the layer and means for cutting the layer into panels of predetermined length. The system includes means for applying a binding agent to the first side of the base layer panel, means for providing a cover layer having a top and bottom surface, and means for connecting the bottom surface of the cover layer to the first surface of the base layer panel.

The system may further comprise means for drying the panels, means for spraying dry magnesium oxide onto the panels, and means for stacking the panels.

BRIEF DESCRIPTION OF THE SEVERAL VIEWS OF THE DRAWINGS

To these and to such other objects that may hereinafter appear, the present invention relates to an improved magnesium-oxide based composite board and the process for manufacturing same as described in detail in the following specification and recited in the annexed claims, taken together with the accompanying drawings, in which like numerals refer to like parts in which:

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

DETAILED DESCRIPTION OF THE INVENTION

Figure 1A:
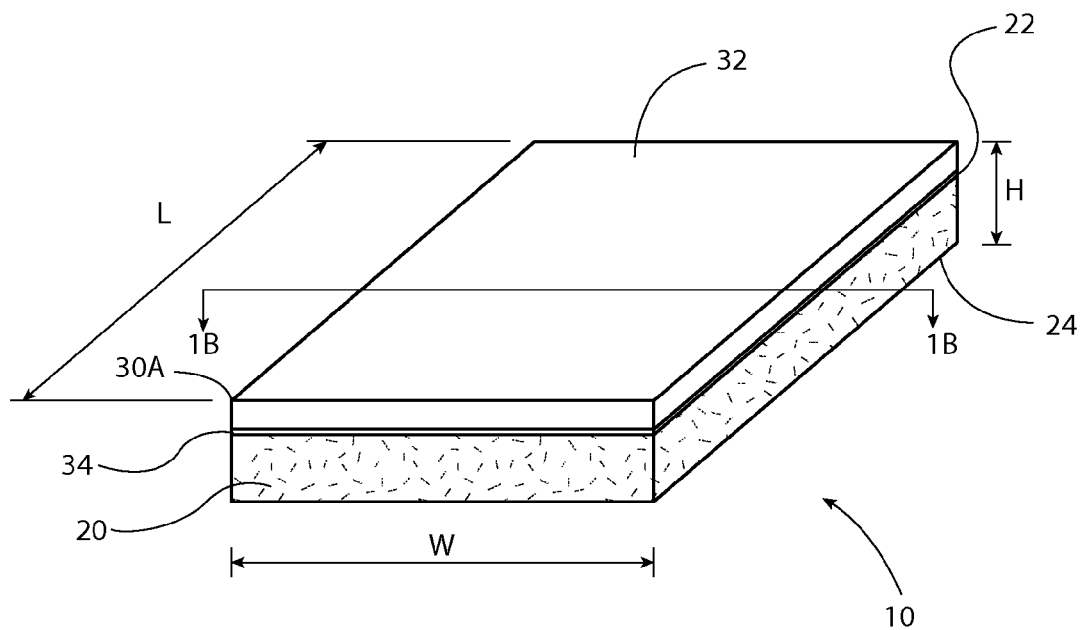
FIG. 1A is a perspective view of a composite board having a base panel layer bonded to a cover layer, in accordance with the preferred embodiment of the present invention.
Figure 1B:
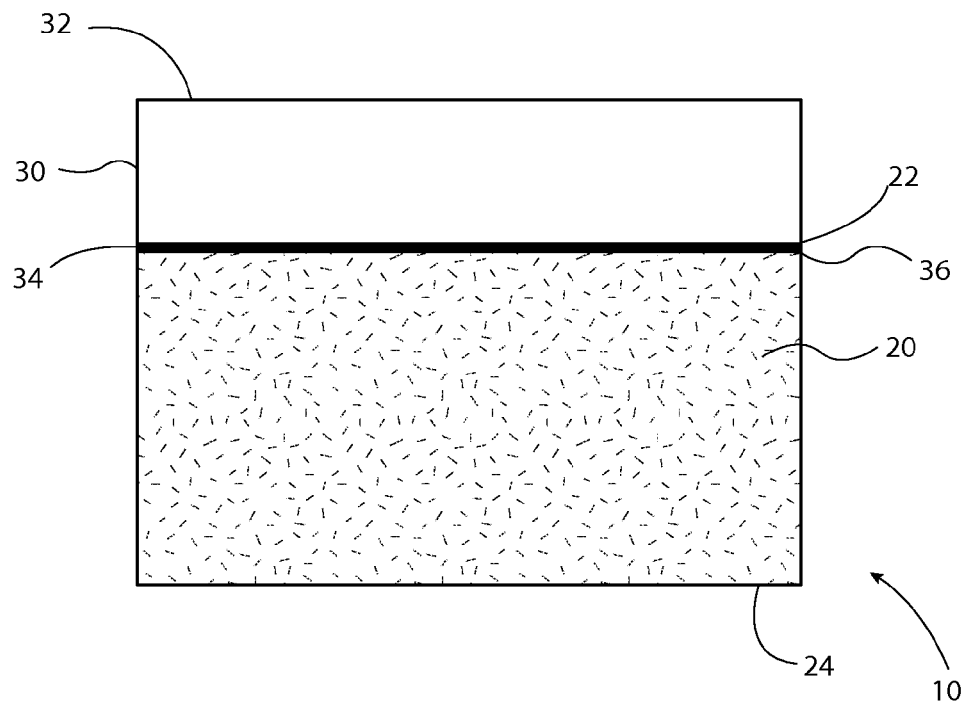
FIG. 1B is a cross-sectional view of the composite board taken along line 1B-1B of FIG. 1A.

Referring now to FIGS. 1A and 1B, there is shown an improved composite board 10 in accordance with the preferred embodiment of the present invention. The board 10 includes a length L, width W and height H, which may be varied to suit particular needs.

The board 10 may be used in a variety of ways during the fabrication of a house or other type of structure. Without limitation, the boards 10 are used for constructing floors, walls, roofing, siding, and ceilings. By varying the height H of the boards, the constructed walls may be load bearing or non-load bearing.

The composite board 10 has a base panel layer 20 having a first side 22 and a second side 24 opposite the first side. The base panel layer 20 is made from a composition comprising one or more of the following ingredients, magnesium oxide (MgO), recycled magnesium oxide, fibrous chips, wood chips, bamboo chips, water, and chemical additive.

The composite board 10 includes a cover layer 30 having a top surface 32 and bottom surface 34. Preferably, the cover layer 30 is wood or linoleum. The cover layer 30 is arranged on the base panel layer 20. In particular, the bottom surface 34 of the cover layer 30 is bonded to the first side 22 of the base panel layer 20 by a binding agent 36. Preferably, the binding agent is glue and more particularly fish glue or seccotine.

In the preferred embodiment, the base panel layers 20 are made using recycled magnesium oxide materials that are ground up excess portions (e.g. scraps) from prior fabrication processes. That is, as the panels are cut to size, sanded and trimmed, the leftover scraps and shavings are ground up and reused to make future base panel layers. In the below table, the row labeled "New MgO" refers to the ingredients used to make the base panel layers without reusing leftover board scraps from prior fabrication processes. The "New MgO" has a preferred purity of at least 79%. The row labeled "Recycled MgO" refers to ingredients used to make the base panel layer while reusing leftover panel scraps from prior manufacturing processes. The row labeled "Bamboo chips" refers to ingredients produced from a machine, which creates chips using the whole bamboo. In the preferred embodiment, the base panel layer comprises ingredients listed below in Table 1.

TABLE 1

| (preferred embodiment) | |
| --- | --- |
| Ingredients | Weight Range (%) |
| New MgO | 5% |
| Recycled MgO | 50% |
| Bamboo Chips | 40% |
| Chemical additive in aqueous solution | 5% |

In alternate embodiments, recycled MgO may be replaced with low-grade material having purity as low as 20%. In addition, bamboo chips may be replaced with wood or other fibrous chips. In one such alternate embodiment, the base panel layer comprises ingredients listed below in Table 2.

TABLE 2

| (alternative embodiment) | |
| --- | --- |
| Ingredients | Weight Range (%) |
| New MgO | 5% |
| Low-grade material | 50% |
| Fibrous Chips | 40% |
| Chemical additive in aqueous solution | 5% |

FIG. 1A illustrates a cross-sectional view of the composite board 10, which generally comprises the base panel layer 20 composed of various ingredients described above and the cover layer 30. As illustrated, the base panel layer is preferably composed of one single layer of mixed ingredients having varying particle size, including fibrous or bamboo chips 12. The preferred composition calls for ingredients within a very large range of particle size. Normally, the smaller the particle size the better the composition, and the better the composition the more expensive the product. However, the present process is able to utilize ingredients having a much larger and variable particle sizes in order to provide a base panel layer with superior quality. In addition, the base panel layer 20 no longer requires fiberglass fabric or sheet layers above and/or below the panel 10.

Figure 2A:
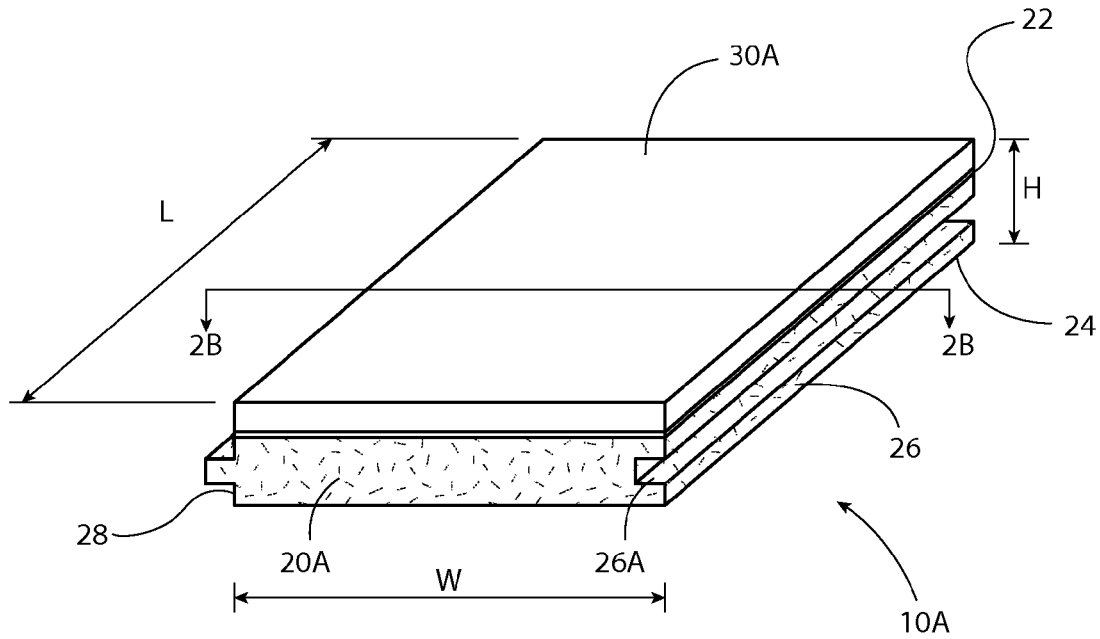
FIG. 2A is a perspective view of a composite board having a base panel layer bonded to a cover layer, in accordance with an additional embodiment of the present invention.
Figure 2B:
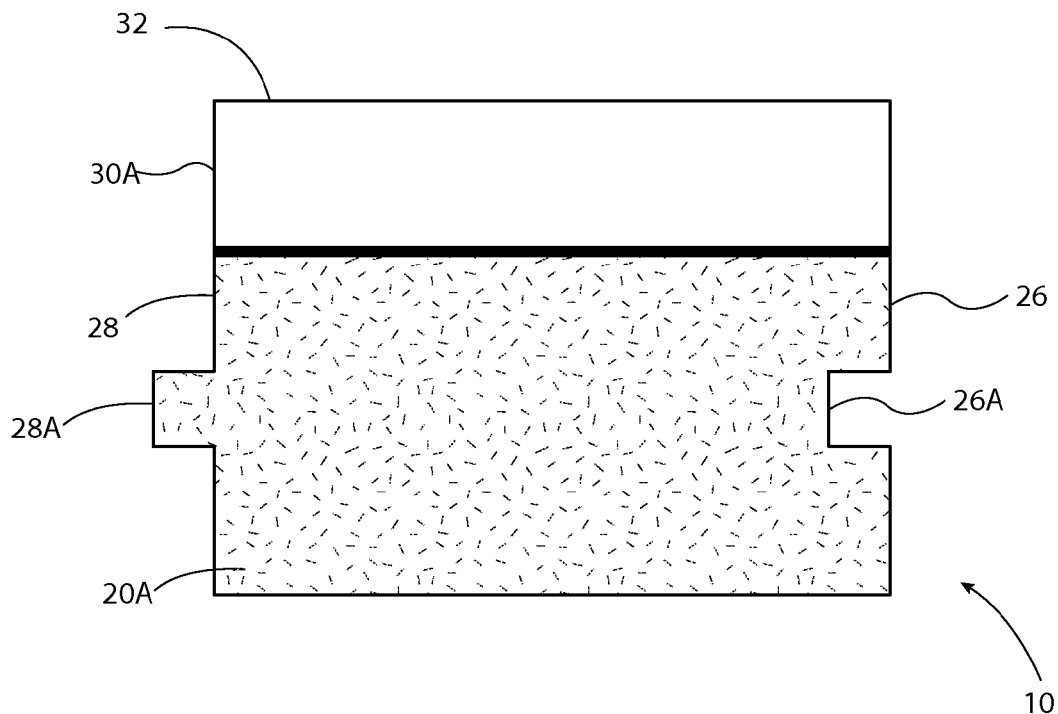
FIG. 2B is a cross-sectional view of the composite board taken along line 2B-2B of FIG. 2A.

FIGS. 2A and 2B illustrate an alternate embodiment of the composite board 10A wherein the base panel layer 20A includes a first end 26 having a groove 26A and a second end 28, opposite the first end, having a protrusion 28A. The grooves 26A of a first board 10 are matingly engaged with the protrusions 28A of a second board 10 to form a wall or floor surface.

Figure 3:
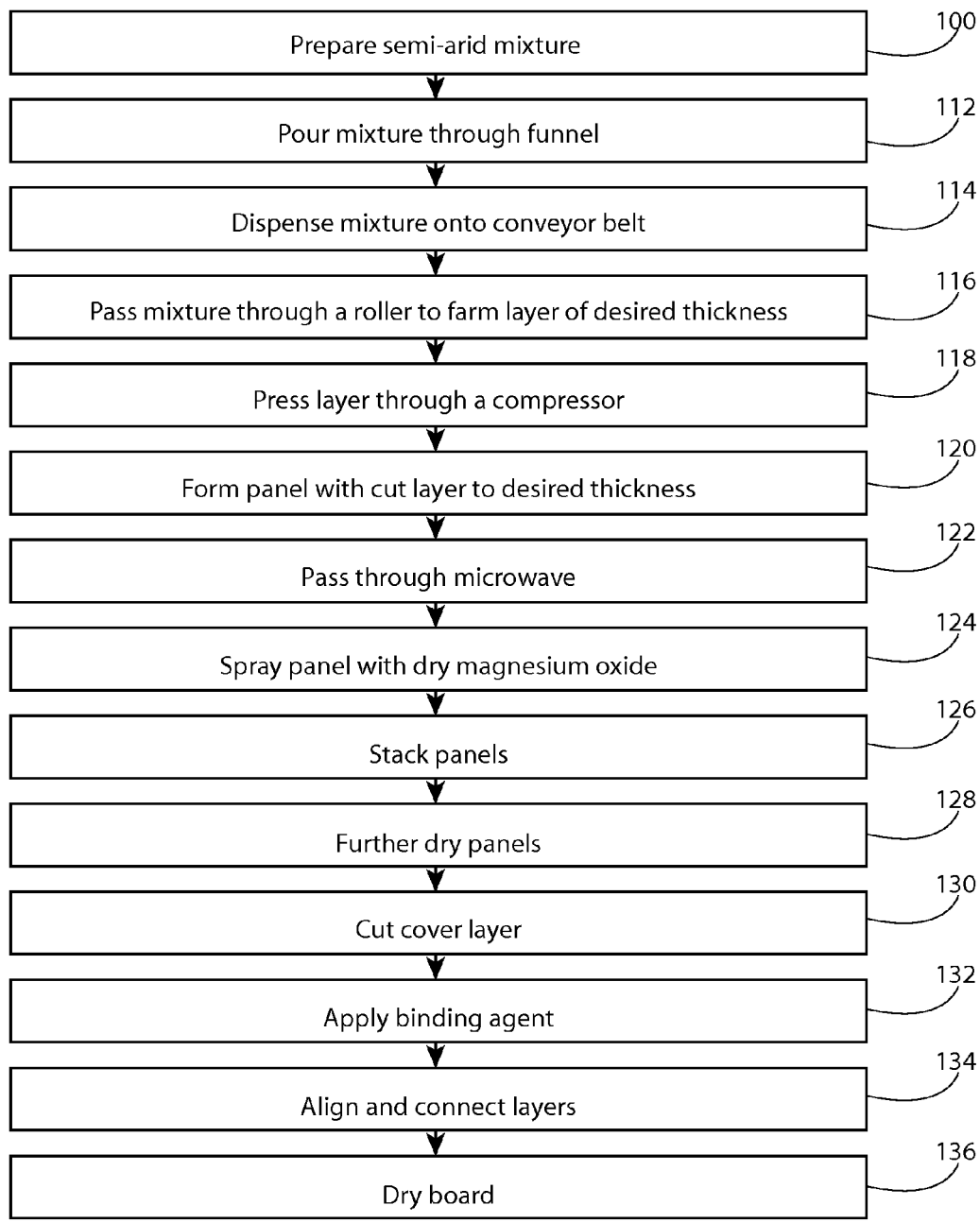
FIG. 3 is a flow chart of the preferred method of fabricating the base panel layer of the composite board in accordance with FIG. 1A of the present invention.
Figure 4A:
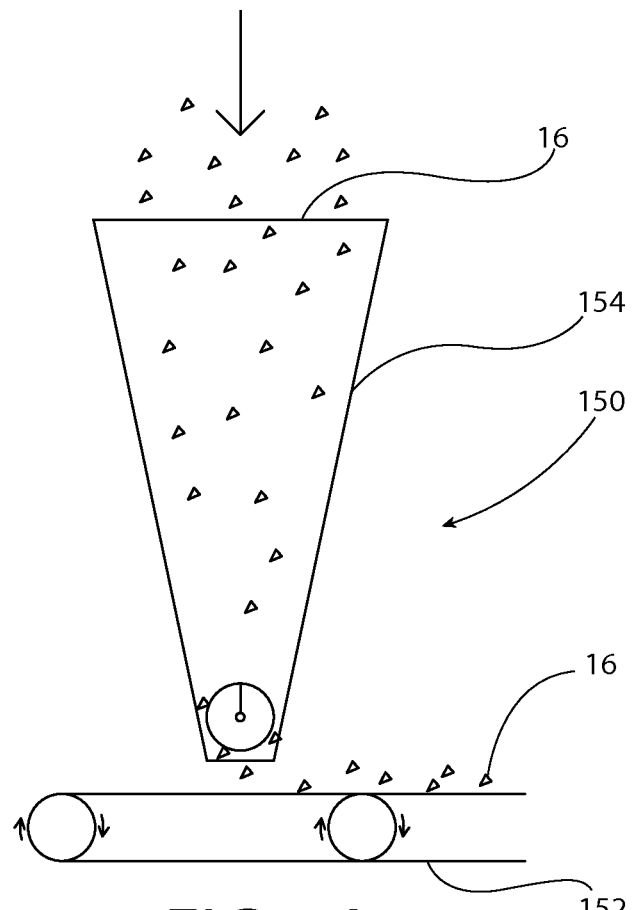
FIG. 4A is a cross-sectional view of a first step in the process for manufacturing the base panel layer, showing the mixture being poured through a funnel.
Figure 4B:
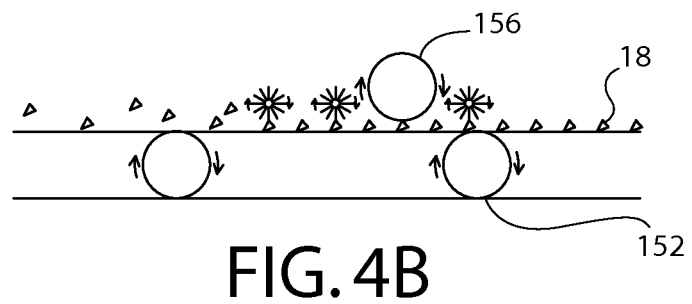
FIG. 4B is a cross-sectional view of a second step in the process for manufacturing the base panel layer, showing the mixture being spread onto the conveyor belt.
Figure 4C:
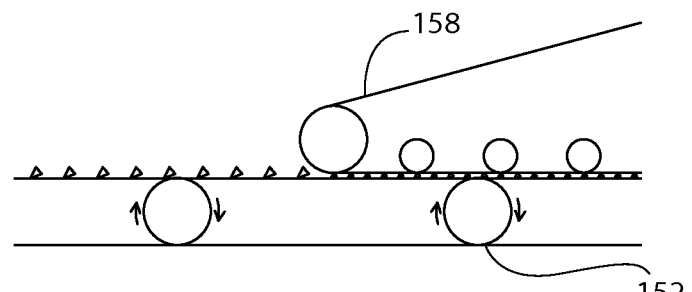
FIG. 4C is a cross-sectional view of a third step in the process for manufacturing the base panel layer, showing the mixture being compressed onto the conveyor belt.
Figure 4D:
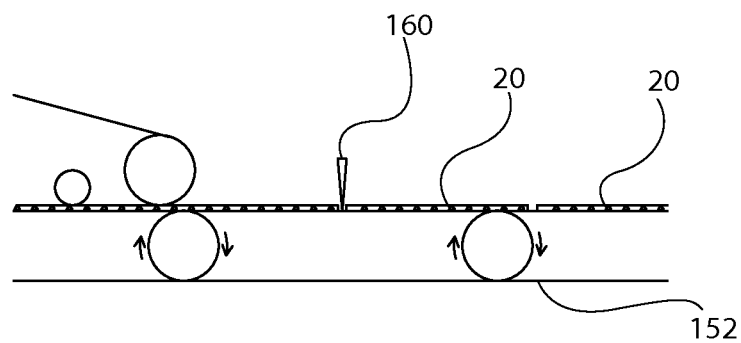
FIG. 4D is a cross-sectional view of a fourth step in the process for manufacturing the base panel layer, showing the layer being cut into panels.
Figure 4E:
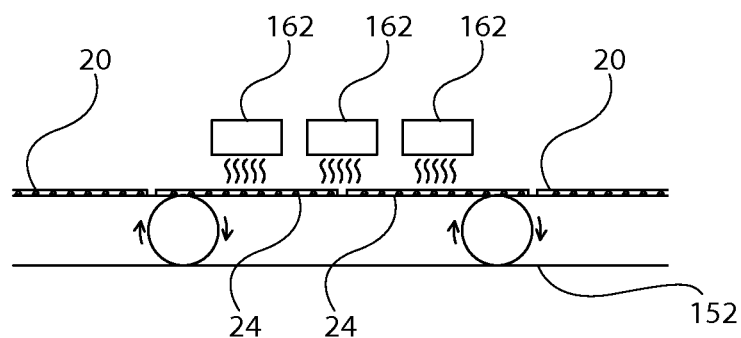
FIG. 4E is a cross-sectional view of a fifth step in the process for manufacturing the base panel layer, showing the panel passing through at least one tunnel and heated.
Figure 4F:
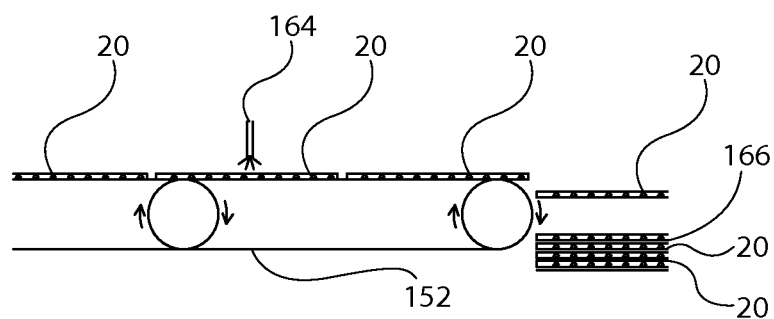
FIG. 4F is a cross-sectional view of a six step in the process for manufacturing the base panel layer, showing the conveyor passing the panel through a jet spraying dry magnesium oxide, before discarding the panel onto a stack.
Figure 4G:
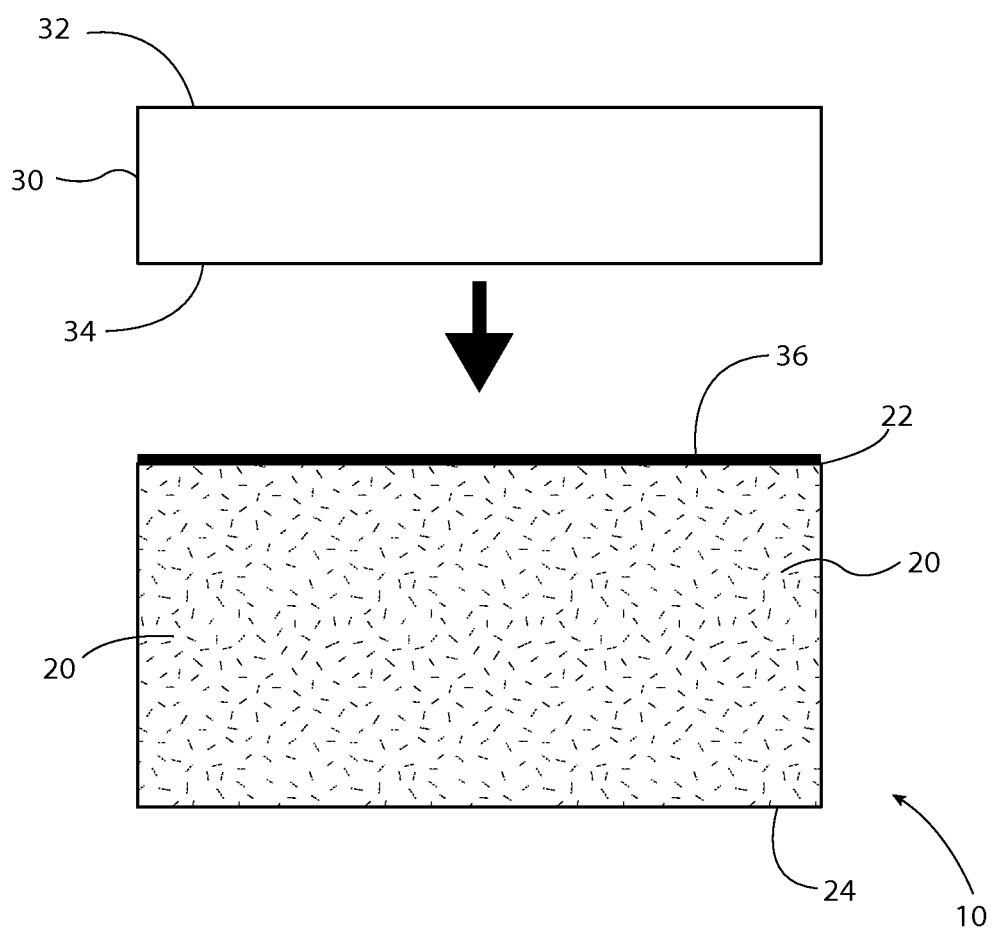
FIG. 4G is a cross-sectional view of the composite board of FIG. 1, showing the method for bonding the base panel layer to the cover layer, in accordance with the preferred method of the present invention.

FIG. 3 illustrates the preferred method 100 for fabricating the base panel layer 20 of the present invention. The method 100 includes a plurality of steps 112-136. The order of these steps may be varied and at least some of the steps are performed sequentially and may be formed concurrently.

The first step 110 of the method 100 includes mixing magnesium oxide with low grade or recycled board materials, and preferably fibrous or bamboo chips, and a chemical additive in an aqueous solution to create a semi-arid mixture. The second step 112 involves pouring the semi-arid mixture through a funnel. In the third step 114, the semi-arid mixture is dispensed through the funnel onto a conveyor belt. In the fourth step 116, the dispensed mixture is passed through a first roller. The first roller is configured to press the semi-arid mixture against the conveyor belt and form a base panel layer of desired thickness. The fifth step 118 involves pressing the base layer through a compressor, where the compressor is configured to remove excess liquid from the base layer and compress the base layer to a desired thickness. In the sixth step 120, the compressed base layer is cut using a cutting blade, into base panel layers of predetermined length. In the seventh step 122, the base panel layers are cured by mild heat. Preferably, the conveyor belt delivers the base panel layers through the tunnel, which exposes the base panel layer to drying by at least one tunnel providing solar energy in order to raise the temperature of the base panel layer from 30 degrees Celsius to 60 degrees Celsius plus or minus 5 degrees. After the base panel layers pass through the solar energy in the tunnel, they are approximately 85% dry. In the eighth step 124, the base panel layers pass through a powder puffing jet, where dry magnesium oxide is sprayed from the jet onto the base panel layers. In the ninth step 126, the base panel layers exit the conveyor belt and are stacked by a stacking machine on top of one another. Additional steps 128 may include further curing when the ambient temperature is warm or hot. Under extreme weather elements, it may take additional time for the base panel layers to dry and cure 100%. However, even when the ambient temperature is as low as 6 degrees Celsius, it usually only takes a few hours for the panels to completely cure.

The remaining steps 130-136 involve combining the base panel layers 20 with the cover layer 30 to form the composite board. In the tenth step 130, the cover layer is provided and cut to a predetermined length and width. In the eleventh step 132, a binding agent 36 is applied to at least the first side 22 of the base panel layer 20. In the twelfth step 134, the bottom surface 34 of the cover layer is aligned with the first side 22 of the base panel layer 20 and then the cover layer 30 is pressed onto the base panel layer 30 connecting the two layers together. In the thirteenth step 136, the binding agent is dried and the layers solidify together to form the composite board 10.

FIGS. 4A-4G illustrate a system including a variety of steps within the production line assembly process 150 for manufacturing the composite board 10. In the preferred embodiment, the process 150 includes the conveyor belt 152 for transporting the mixture through the plurality of actions 112-128. In alternate embodiments, the conveyor belt may be substituted for other methods of transport by and between steps of the methods. Once mixed, the semi-arid mixture 20 is poured through the funnel 154 or hopper and dispensed from the funnel 154 onto the conveyor belt 152. The conveyor belt 152 transports the semi-arid mixture 16 to the roller 156 or spreader in order to form a layer 18 of desired thickness. Next, the layer 18 travels by conveyor belt 152 to the compressor 158, and is pressed to remove excess liquid therefrom. The conveyor belt then transports the base panel layer 20 to the cutter 160 and cuts the layer into base panel layers 20 of desired dimensions. The base panel layer 20 is then dried by passing through at least one tunnel providing solar energy 162, before passing a spray jet 164 and being sprayed with dry magnesium oxide. Once sprayed, the base panel layers are stacked 166 for storage or transport by a stacking machine.

Then, the base panel layers 20 are combined with a cover layer 30 to form the composite board 10. The cover layer is provided and cut to a predetermined length and width. The binding agent 36 is applied to at least the first side 22 of the base panel layer 20. Next, the bottom surface 34 of the cover layer 30 is aligned with the first side 22 of the base panel layer 20 and then the cover layer 30 is pressed onto the base panel layer 30 connecting the two layers together. Finally, the binding agent is dried and the layers solidify together to form the composite board 10.

In conclusion, herein is presented improved magnesium-oxide based composite board and the process for manufacturing same. The invention is illustrated by example in the drawing figures, and throughout the written description.

It should be understood that numerous variations are possible, while adhering to the inventive concept. Such variations are contemplated as being a part of the present invention.

While only a limited number of preferred embodiments of the present invention have been disclosed for purposes of illustration, it is obvious that many modifications and variations could be made thereto. It is intended to cover all of those modifications and variations, which fall within the scope of the present invention as defined by the following claims.

We claim:

1. A method of manufacturing a composite board, the steps comprising:
    a. providing a single base layer panel having a substantially smooth first side and a second side opposite said first side, said providing of said single base layer panel includes the steps of:
        i. preparing a chloride-free semi-arid mixture of high purity magnesium oxide, low purity magnesium oxide, fibrous chips, and chemical additive in an aqueous solution;
        ii. pouring said semi-arid mixture through a funnel;
        iii. dispensing said semi-arid mixture from said funnel onto a conveyor belt;
        iv. passing the dispensed semi-arid mixture through a roller, where the roller is configured to press and spread said semi-arid mixture against the conveyor belt to a layer of desired uniform thickness;
        v. pressing the layer through a compressor, where the compressor is configured to remove excess liquid from said layer; and
        vi. cutting said compressed layer into at least one said base layer panel of predetermined length;
    b. apply a binding agent to said first side of said single base layer panel;
    c. providing a cover layer having a top and bottom surface; and
    d. connecting the bottom surface of said cover layer to said first side of said single base layer panel.

2. The method of claim 1 wherein the high purity magnesium oxide has purity of at least 79%.

3. The method of claim 1 wherein the low purity magnesium oxide mixture further comprises recycled base layer panels.

4. The method of claim 1 wherein the fibrous chips are from the group consisting of wood and bamboo chips.

5. The method of claim 1 further comprises drying the at least one base layer.

6. The method of claim 1 further comprising heating the at least one base layer panel to a desired temperature.

7. The method of claim 6 wherein the at least one base layer panel is heated by solar energy.

8. The method of claim 1 further comprising:
    passing the at least one single base layer panel through a jet, where the jet is configured to spray dry magnesium oxide on the at least one single base layer panel; and
    stacking at least two single base layer panels.

* * * * *